United States Patent [19]

Van Der Valk

[11] 4,450,473
[45] May 22, 1984

[54] CAMERA SYSTEM FOR COLOR TELEVISION

[75] Inventor: Nicolaas J. L. Van Der Valk, Breda, Netherlands

[73] Assignee: U.S. Philips Corp., New York, N.Y.

[21] Appl. No.: 319,835

[22] Filed: Nov. 9, 1981

[30] Foreign Application Priority Data

Dec. 2, 1980 [NL]  Netherlands ................. 8006546

[51] Int. Cl.³ .............................................. H04N 9/62
[52] U.S. Cl. ................................................... 358/10
[58] Field of Search ................. 358/10, 21 R, 22, 51

[56] References Cited

U.S. PATENT DOCUMENTS

Re. 28,021  5/1974  Boxman et al. ............... 358/22
4,163,249  7/1979  Michael et al. ............. 358/21 R

*Primary Examiner*—Richard Murray

*Attorney, Agent, or Firm*—Thomas A. Briody; William J. Streeter; Charles E. Quarton

[57] ABSTRACT

A camera system for color television comprising a color television camera, a control unit and a signal processing circuit. As hue signal the signal processing circuit produces a composite color difference signal $p(R-Y)+q(B-Y)$, wherein p and q are combination factors, R and B are color signals and Y is a luminance signal. In addition to the fact that this hue signal can be employed in known manner for chroma keying signal generation it is employed in accordance with the invention to check the registration on display. Herein, there is a choice between three fixed combinations of the combination factors p and q, the signal processing circuit producing a difference signal $R-G$, $R-B$ and $B-G$, respectively. For the standardized luminance signal $Y=0.59G+0.30\ R+0.11\ B$ it follows that: $p=8q$, $p=-q$ and $7p=3q$, respectively.

2 Claims, 1 Drawing Figure

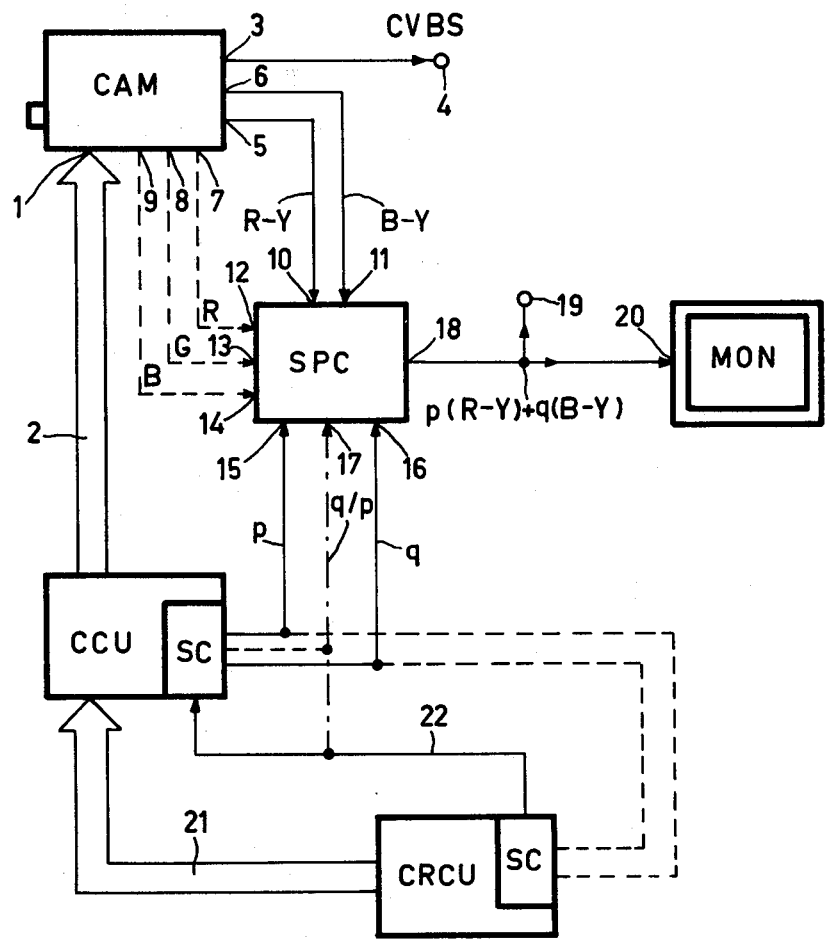

CAMERA SYSTEM FOR COLOR TELEVISION

The invention relates to a camera system for color television, comprising a color television camera, a control unit and a signal processing circuit, signal inputs of the signal processing circuit being connected to camera outputs for carrying three colour signals R, G and B or two color difference signals R-Y and B-Y, Y which is the luminance signal being a combination of the color signals, and at least one control input of which is connected to at least one output of the control unit, the signal processing circuit having an output for carrying a composite color difference signal $p(R-Y)+q(B-Y)$, wherein p and q are combination factors.

In a camera system of this type the composite color difference signal which is the what is commonly referred to as hue signal, can be employed for chroma keying signal generation. The ratio between the combination factors in the composite color difference signal then determines that hue on display with which the chroma keying signal is associated. For such an application reference is made to U.S. Pat. No. Re. 28021.

The invention has for its object to employ the said hue signal for a use different from the above-described use, namely to check the registration on display of signals to be displayed on a screen.

According to the invention, a camera system is therefore characterized in that the control unit comprises a selection circuit connected to at least one control input of the signal processing circuit for selecting one out of three fixedly-adjusted values of the ratio between the combination factors p and q, as a result of which, depending on said choice, the output of the signal processing circuit carries a difference signal R-G, R-B and B-G, respectively of always two of the three color signals R, G and B.

The invention is based on the recognition of the fact that the registration can be checked in a simple way when, the hue signal being available, a choice can be made from three fixed combinations of the combination factors p and q.

A simple construction of a camera system in accordance with the invention, it holding for the luminance signal that $Y=0.59G+030R+0.11B$, is characterized in that for the obtention of the difference signal R-G, R-B and B-G, respectively for the value, fixed in the selection circuit, of the ratio between the combination factors p and q, it approximately holds that: $p=8q$, $p=-q$ and $7p=3q$, respectively.

The invention will now be further described with reference to an embodiment which is shown by way of non-limitative example in the accompanying FIGURE.

The FIGURE shows a block schematic circuit diagram of a camera system in accordance with the invention which includes: a color television camera CAM, a camera control unit CCU provided at the camera CAM, a camera remote control unit CRCU, a signal processing circuit SPC and a display device MON connected thereto. The camera CAM comprises, for example, three pick-up devices by means of which optical information coming from a scene is converted into picture signals by means of a line and field-sequential scanning of potential images. The camera CAM has an input 1 to which control signals are applied from the control unit CCU, via, for example, a multi-wire line 2. Under the control from the control unit CCU the camera CAM produces a color video signal CVBS at an output 3 which is connected to an output terminal 4 of the camera system. The signal CVBS is, for example, the color video signal which is laid down in a television standard and which comprises blanking and synchronizing pulses. In addition, the camera CAM has two outputs 5 and 6 which carry a what is commonly referred to as color difference signal R-Y and B-Y, respectively. Instead of the outputs 5 and 6 the camera CAM may alternatively have outputs 7, 8 and 9, which carry color signals R, G and B, respectively. The color signals R, G and B correspond to the red, green and blue, information respectively present in a scene recorded by the camera CAM, which is not further shown. A certain combination of the color signals R, G and B correspond to a what is commonly referred to as luminance signal Y for which it holds in accordance with what standards prescribe that:

$Y=0.59G+0.39R+0.11B$. On the basis of this prescription it is possible to calculate which combination of the color signals R, G and B corresponds to the color difference signals R-Y and B-Y, respectively.

The outputs 5 and 6 carrying the signals R-Y and B-Y or the outputs 7, 8 and 9 carrying the signals R, G and B are connected to signal inputs 10, 11 and 12, 13, 14, respectively of the signal processing circuit SPC. In addition, the circuit SPC has two control inputs 15 and 16 or one single control input 17, and an output 18. Information is applied to the inputs 15 and 16, or the input 17, respectively as a result of which a composite color difference signal $p(R-Y)+q(B-Y)$ is produced at the output 18, p and q being combination factors. In the FIGURE it is shown that information which corresponds to the factor p and q, respectively is applied to the inputs 15 and 16. When there is only the single control input 17, information which corresponds to a ratio between the combination factors p and q, namely q/p is applied thereto.

The signal $p(R-Y)+(R-Y)$ at the output 18 is applied to an output terminal 19 of the camera system. The signal at the output terminal 19, being the hue signal, may be employed in known manner for chroma keying signal generation. The ratio between the combination factors p and q in the composite color difference signal $p(R-Y)+q(B-Y)$ determines on display the hue with which the chroma keying signal is associated. For a further explanation thereof reference is made to U.S. Pat. No. Re. 28021. Herein, the factors p and q correspond, for example, with a cosine and sine function, so that a hue signal $(R-Y)\cos x+(B-Y)\sin x$ is obtained, wherein the angle x corresponds to a setting voltage for the cosine and sine function generator. If it is assumed that the cosine and sine function generators are provided in the circuit SPC itself, it is sufficient to apply the information q/p, which is given by the setting voltage corresponding to the angle x to the single control input 17. In the said patent the setting voltage corresponding to the angle x is adjustable between 0 and 5 Volts, x being variable from $-180°$ to $+180°$. For 2.5 Volts it holds that: $\cos x=1$ and $\sin x=0$.

In addition to the fact that the signal processing circuit SPC may produce in known manner the hue signal $p(R-Y)+q(B-Y)$ for chroma keying signal generation in a generator, not shown, which is connectable to the output terminal 19, the circuit SPC in the camera system in accordance with the invention is further employed for performing a registration check. For a visual check the output 18 of the circuit SPC is connected to an input 20 of the display device MON, a predetermined choice being made in a manner still to be described from three prescribed ratios between the combination factors p and q. To this end, the inputs 15 and 16, and the input 17, respectively of the circuit SPC are connected to outputs of a selection circuit SC which is provided in, for example, the control unit CCU and CRCU, respectively. In the presence of the remote control unit CRCU, said circuit can be active directly or via the control unit CCU and the selection circuit SC included therein at the camera CAM and the circuit SPC, which last-mentioned possibility is indicated by the connecting lines 21 and 22.

The following description serves to explain the operation of the camera system in accordance with the invention. The visual registration test to be performed by means of the display device MON is carried out by applying a difference signal $R-G$, $R-B$ and $B-G$, respectively to the device MON. The signals R, G and B are, for example, obtained from pick-up devices in which separate line and field-sequential scanning rasters are formed for converting optical information originating from the scene into electric picture signals via a potential image. Scans which are not in registration during recording result in display of a difference signal in blurred contours and scene details. When an operator detects this he will take action, for example by shifting one or two scanning rasters in the camera CAM in the direction of the line and/or field scan by means of the control unit CCU and CRCU, respectively, until proper registration is observed on the screen of the display device.

In accordance with the invention, the difference signals $R-G$, $R-B$ and $B-G$ will be derived from the hue signal $p(R-Y)+q(B-Y)$ by making a choice out of three fixedly adjusted ratios between the combination factors p and q. Starting from the luminance signal $Y=0.59G+0.30R+0.11B$ it follows for the hue signal $p(R-Y)+q(B-Y)$ that no component of the signal B, G and R, respectively is present therein if (approximately) $p=8q$, $p=-q$ and $7p=3q$, respectively so that a signal is obtained having only the signal components R and G, R and B, B and G, respectively, as it follows for the hue signal that it is equal to $(0.7p-0.3q)R-0.59(p+q)G-(0.11p-0.89q)B$.

In an embodiment of the selection circuit SC in the control unit CCU and CRCU, respectively with cosine and sine function generators for the combination factors $p(=\cos x)$ and $q(=\sin x)$ it is obtained for the respective difference signals $R-G$, $R-B$ and $B-G$ that tg $x=0.125$ where $x=7°8'$, tg $x=-1$ where $x=135°$ and tg $x=2.333$ where $x=66°46'$, all this considered between 0 and 180°. In the presence of the cosine and sine function generators in the circuit SPC the application of information to the single operating input 17 is sufficient, the information q/p being given by a d.c. voltage which corresponds to one of the above-mentioned angles x. The selection circuit SC in the control unit CCU and CRCU, respectively then comprises, for example, a voltage divider having three taps which are connectable to the input 17 of the circuit SPC through a three-position selector switch. If the selection circuit SC in the control unit CCU comprises the cosine and sine function generators, the three fixedly adjusted d.c. voltages can be obtained from the selection circuit SC of the remote control unit CRCU via the lead 22.

The three fixedly adjusted ratios between the combination factors p and q hold for the luminance signal Y prescribed in standards. When a luminance signal is used which deviates therefrom, the ratios must be adapted in order to obtain that the difference signals $R-G$, $R-B$ and $B-G$ become available for display on the screen of the display device MON.

Instead of the fact that the operator observing the screen of the display device MON carries out the correction for the registration at the camera CAM or the control unit CCU and CRCU, respectively, consideration might alternatively be given to an automatic correction in which signal edges in each difference signal are made as steep as possible by an automatic shift of one of the scanning rasters.

What is claimed is:

1. A camera system for color television comprising a color television camera, a camera control unit and a signal processing circuit, the camera unit being coupled to the signal processing unit to supply signals containing color information and luminance information, the camera control unit being coupled to the color television camera and the control unit, the signal processing unit generating a composite color difference signal $p(R-Y)+q(B-Y)$, wherein p and q are combination factors, Y is the luminance signal, R is the red color signal, and B is the blue color signal, the improvement comprising a selection circuit included in said signal processing circuit having means for generating three pre-determined test signals, each test signal having a fixed ratio between the combination factors p and q, one of said three test signals being coupled to said signal processing circuit, said signal processing circuit generating a composite color difference signal $R-G$, $R-B$ and $B-G$, respectively for said test signals wherein R is the red color signal, B is the blue color signal and G is the green color signal.

2. A camera system is defined in claim 1 wherein the luminance signal $Y=0.59G+0.30R+0.11B$ and wherein the ratios of the combination factors p and q in said three test signals to produce the three color difference signals $R-G$, $R-B$ and $B-G$ are substantially $p=8q$, $p=-q$ and $7p=3q$, respectively.

* * * * *